(12) United States Patent
Bunn

(10) Patent No.: US 10,286,924 B2
(45) Date of Patent: May 14, 2019

(54) RAIL BUS TRANSPORTATION NETWORK LOOP SYSTEM

(71) Applicant: Frank E. Bunn, Thornhill (CA)

(72) Inventor: Frank E. Bunn, Thornhill (CA)

( * ) Notice: Subject to any disclaimer, the term of this patent is extended or adjusted under 35 U.S.C. 154(b) by 522 days.

(21) Appl. No.: 13/740,769

(22) Filed: Jan. 14, 2013

(65) Prior Publication Data
US 2014/0200753 A1    Jul. 17, 2014

(51) Int. Cl.
| G05D 1/00 | (2006.01) |
| B61B 1/00 | (2006.01) |
| B61L 25/02 | (2006.01) |
| B60F 1/00 | (2006.01) |
| B61B 15/00 | (2006.01) |

(52) U.S. Cl.
CPC .............. B61B 1/00 (2013.01); B60F 1/00 (2013.01); B61L 25/02 (2013.01); B61B 15/00 (2013.01); Y02T 30/30 (2013.01)

(58) Field of Classification Search
CPC ...... B61L 29/00; B61L 23/041; B61L 29/246; B61L 29/32; B61L 29/28; B61L 25/02; B60F 1/00; B61B 1/00; B61B 15/00
USPC .......... 701/19, 117, 118; 246/473.1; 73/490; 105/72.2, 215.2
See application file for complete search history.

(56) References Cited

U.S. PATENT DOCUMENTS

| 2,541,514 | A | * | 2/1951 | Herold | 295/8.5 |
| 4,048,925 | A | * | 9/1977 | Storm | 105/72.2 |
| 4,497,257 | A | * | 2/1985 | White, Jr. | 105/72.2 |
| 4,583,465 | A | * | 4/1986 | Powell, Sr. | 105/215.2 |
| 5,103,740 | A | * | 4/1992 | Masse | 105/72.2 |
| 5,220,870 | A | * | 6/1993 | Larson | 105/159 |
| 5,375,533 | A | * | 12/1994 | Schwendt | 105/166 |
| 5,813,349 | A | * | 9/1998 | Jensen | 104/28 |
| 6,123,629 | A | * | 9/2000 | Yamaguchi et al. | 473/372 |
| 6,169,954 | B1 | * | 1/2001 | McCrary | 701/117 |
| 6,276,542 | B1 | * | 8/2001 | McCrary | 213/75 R |
| 6,324,994 | B1 | * | 12/2001 | Glenn | 105/72.2 |
| 7,491,871 | B2 | * | 2/2009 | Eby | 800/312 |
| 8,061,277 | B2 | * | 11/2011 | Jacob | 105/72.2 |
| 2011/0084176 | A1 | * | 4/2011 | Reichelt et al. | 246/473.1 |

* cited by examiner

Primary Examiner — Gertrude Arthur Jeanglaude

(57) ABSTRACT

A system is revealed comprising existing dual-mode road-rail vehicles and railway vehicles with all vehicles having modern wireless mobile communications and GPS facilities, operating on existing railways, roadways, and roadway-railway crossings for the transportation, pickup, and drop off of passengers and of goods within and about an urban city environment. Fundamental to this system is incorporation methods of modern computer vehicle monitoring and marshalling facilities administering computer fuzzy logic assessment active engines for scheduling, monitoring, and controlling the operation of the vehicles and for providing the communications with the vehicles and the marshalling facilities in the network. The marshalling facilities schedule the operation of the vehicles on the railways and of the vehicles on the roadways, and the entry to or egress from the railways by the dual-mode vehicles, and the pickup and drop off of passengers and goods, thereby providing an optimized and safe transportation networked system.

28 Claims, 5 Drawing Sheets

Fuzzy logic algorithmic system means

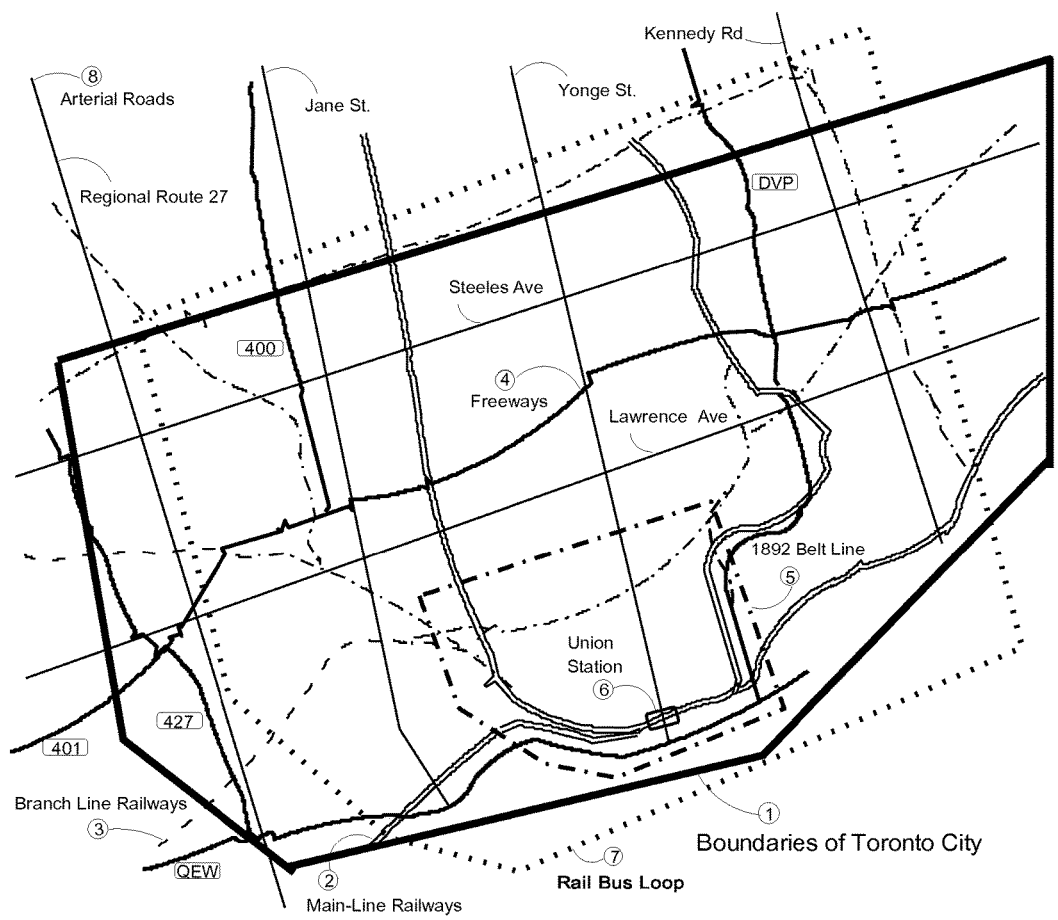
Figure 1. Major Railways and Roads in Toronto, Ontario Canada

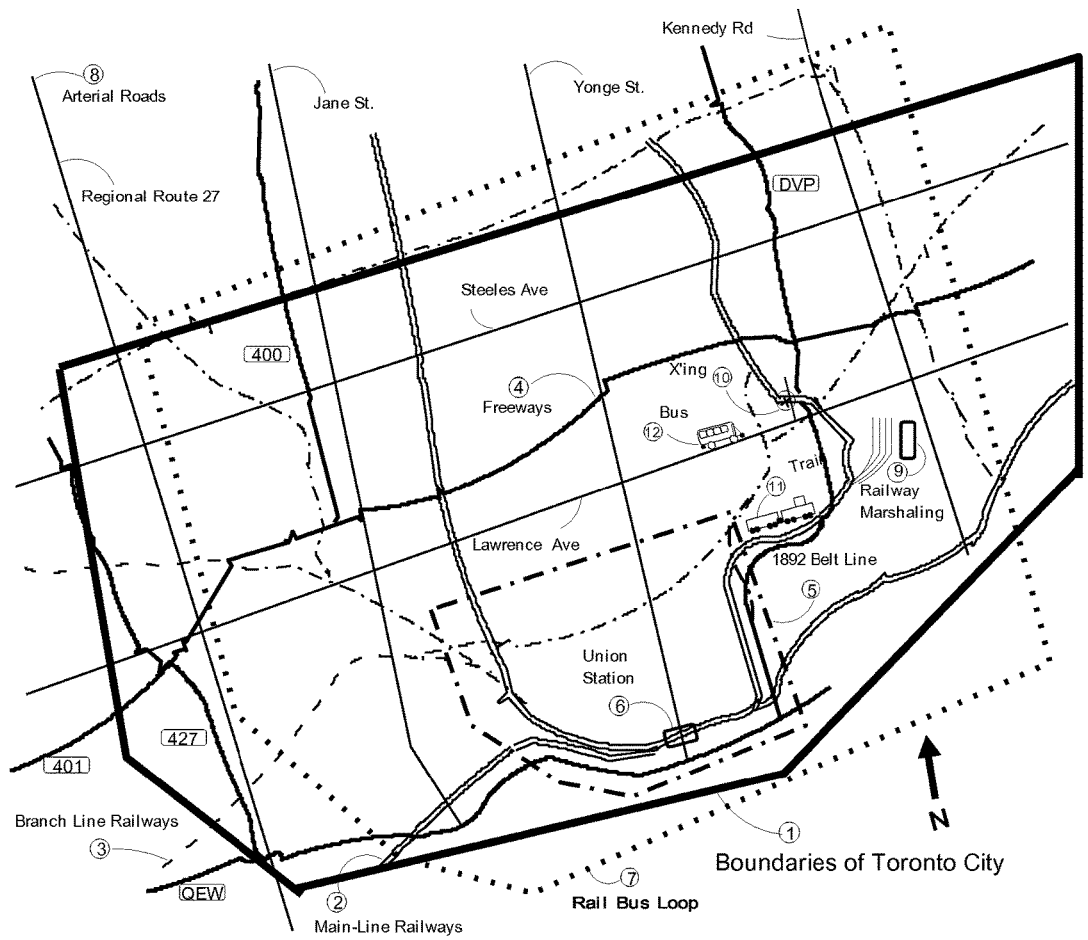
Figure 2. Major Railways and Roads in Toronto, Ontario Canada

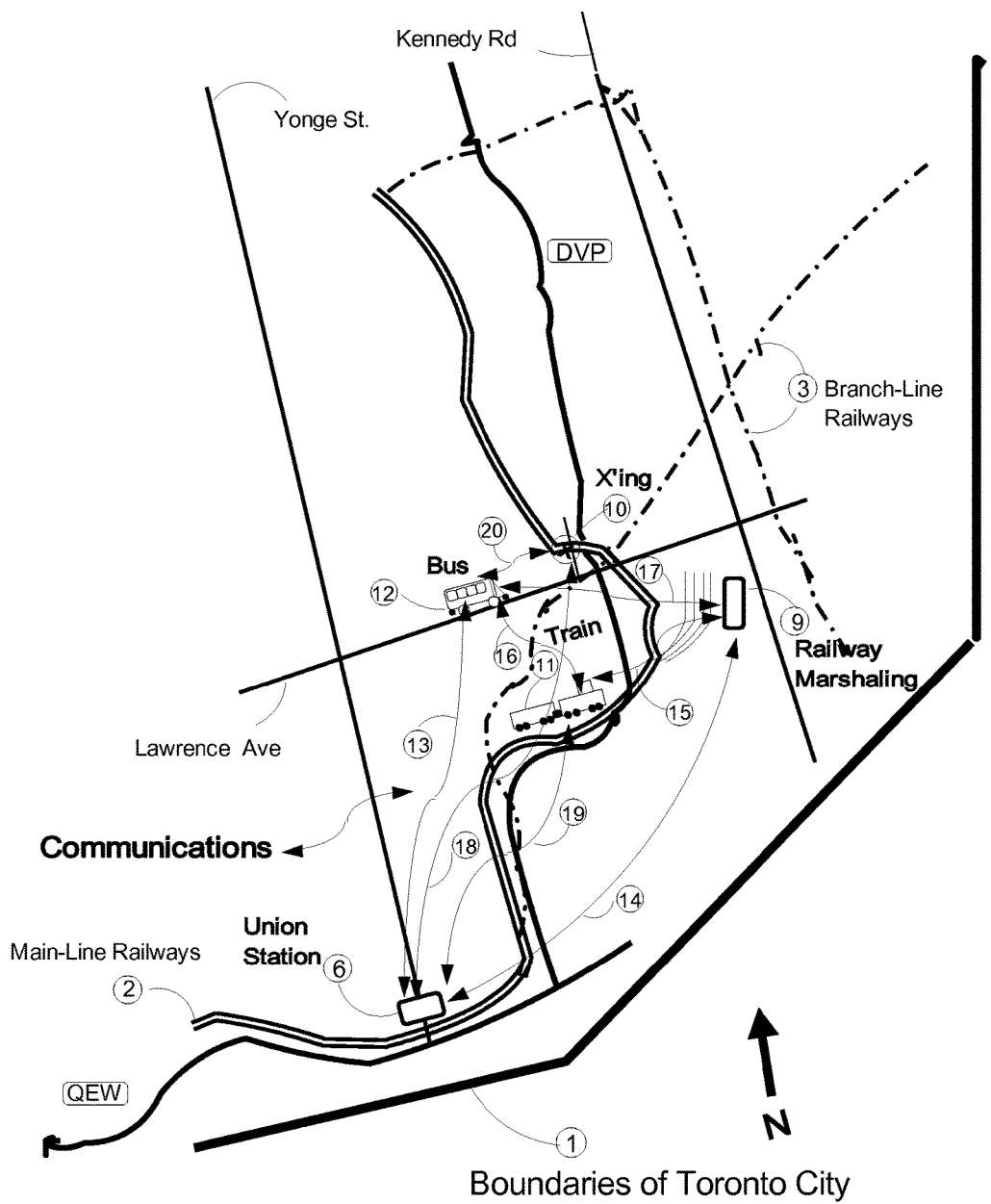
Figure 3. Communications Details: Bus, Train, Union Station, Railway Marshaling

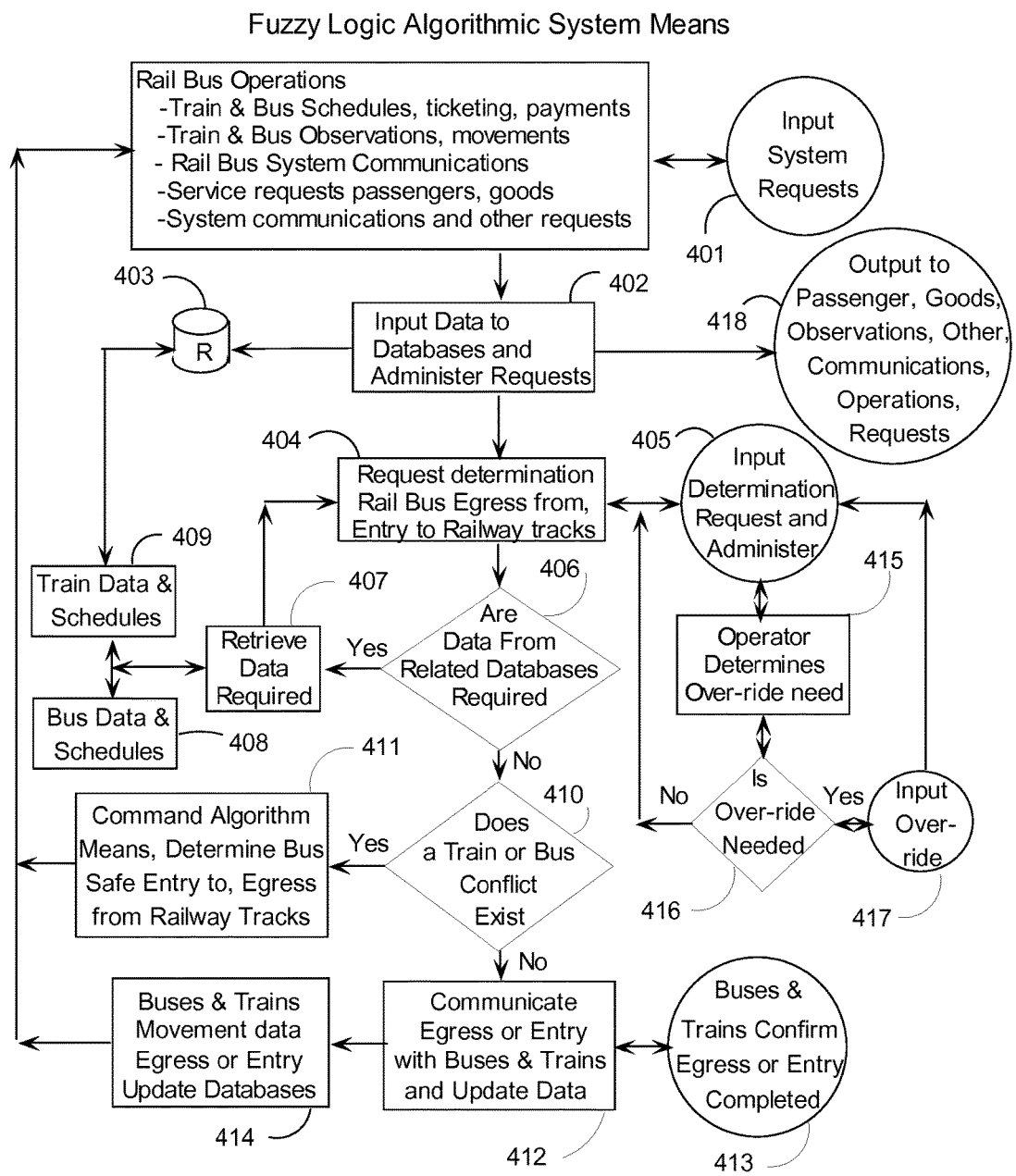
Figure 4. Fuzzy logic algorithmic system means

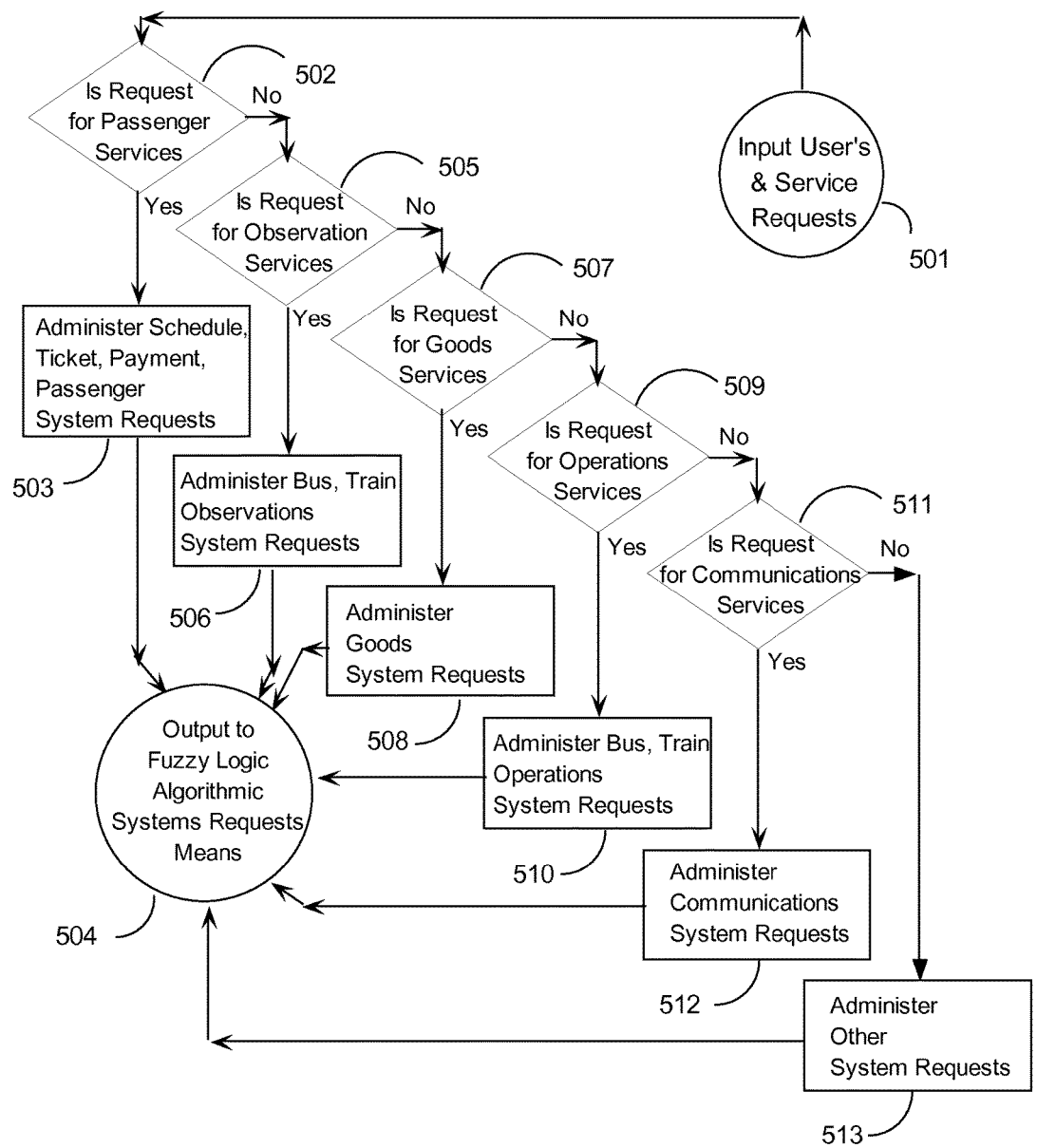
Figure 5. Fuzzy logic Engine system means

RAIL BUS TRANSPORTATION NETWORK LOOP SYSTEM

CROSS-REFERENCE TO RELATED APPLICATIONS

None

STATEMENT REGARDING FEDERALLY SPONSORED RESEARCH OF DEVELOPMENT

None

NAMES OF THE PARTIES TO A JOINT RESEARCH AGREEMENT

None

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

None

STATEMENT REGARDING PRIOR DISCLOSURES BY THE INVENTOR OR A JOINING INVENTOR

None

BACKGROUND OF THE INVENTION

Field of the Invention

The field of this invention is transportation systems with which the integrating of roadway and railway vehicles with modern computer controlled communications systems and marshaling systems utilizes methods of computer fuzzy logic assessment active engines for the scheduling, monitoring, and controlling the safe operation of the vehicles within a transportation networked system.

Description of Related Art

BACKGROUND OF THE INVENTION

It has taken mankind approximately 200,000 years to go from walking on two legs to riding in vehicles operating on roadways and railroads but perfecting passenger transportation combining both into integrated networks with dual purpose vehicles has before now, yet to be perfected.

*Homo sapiens* walking upright on two legs evolved in Africa over 200,000 years ago and left Africa approximately 70,000 years ago, eventually arriving in the Americas about 15,000 years ago according to an article "Climate change key to world domination" in the New Scientist, 22 Sep. 2012, by Michael Marshall. Cynthia Phillips and Shana Priwer in the WEB site "http//inventors.about.com" article "History of the Wheel", note that the oldest wheel, a potters wheel, was discovered in ancient Mesopotamia dating back to 3500 BC and the oldest transportation wheel, a chariot wheel, also was found in Mesopotamia dating back to 3200 BC. A "History of Transport and Travel" by Bamber Gascoigne (www.historyworld.net) notes that the oldest known 4-wheeled wagon was actually discovered in what is now Zuick, Switzerland, and dates back to this 3200 BC time period. These authors suggest that the first spoked wheels appear to have come from Egyptian chariots dating back to approximately 2000 BC at which time the horse becomes available in Mesopotamia. And, between 200 BC and 200 AD the great network of Roman Roads were constructed as the arterial system of the Roman Empire. The birth of mobile road vehicle transportation began.

An article, "Outline of Railroad History", by Mary Bellis ("http//inventors.about.com"), notes that the first roads of wooden rails, called Wagonways, were being used as early as 1550 in Germany for use by horse-drawn wagons and by 1776 iron rails had replaced the wooden rails. In 1789, Englishman William Jessup designed the first flanged wagon wheels, and in 1803 the first steam engine tramway using these wheels was built in Merthyr Tydfil Wales, by Richard Trevithick. In 1821 Englishman Julius Griffiths patented the first passenger road locomotive and in 1825 English inventor, George Stephenson designed the first locomotive pulling passenger cars demonstrating the carrying of 450 passengers. A Wikipedia Encyclopedia reference "Transportation in Toronto" noted that in 1892-1894 James David Edgar created the "Toronto Belt Line Railway" encircling the then core downtown area; although it failed due to being commercially unsuccessful the need for some type of transit system around an urban city was recognized. The birth of railway transportation began.

In the Wired Magazine, March 2008 issued, an article "The bus starts here", by Randy Alfred, notes that horse-drawn wagons specifically for passengers were horse-drawn buses with the first known public bus line being launched in 1662 by inventor, Blaise Pascal in Paris France although it lasted only some 15 years. A Wikipedia Encyclopedia reference "Bus", notes that extensive horse-drawn buses reappeared for public transportation in many cities from the 1820's onward and were followed by steam driven buses in 1882 and electric trolley busses by 1882. The birth of carriage trade transportation began.

A Wikipedia Encyclopedia reference "What year was the first car made" notes that the German inventor, Karl Benz, patented the first automobile powered by an Otto-cycle gasoline engine in 1895 though as early as 1890 cars were being built for the public buyers by Karl Benz and Gottlieb Daimler in Germany and Albert de Dion and Armand Peugeot in France. However mass production of cars for public consumption is credited to the USA inventor, Henry Ford with the first mass produced car the 1908 Model T. The birth of vehicle transportation on roads began.

There have been many attempts to integrate the flanged steel wheels of railway vehicles into the rubber wheeled roadway vehicles. A Wikipedia article on "Road-rail vehicle" notes that although many road-rail vehicles have been designed and road-rail technology dates back to the 1940's by Fairmont Railway Motors and these special purpose vehicles are in common use by railways today for transferring a locomotives by road, and for shunting as well as for track maintenance. However, the same Wikipedia article on "Road Rail buses" notes that many attempts to date to introduce buses and coaches that operate on both roads and rails have never been particularly successful, citing attempts as early as the 1930's in Britain on the Nicky Line by the LMS company and the New South Wales Railways in the 1970's, and by the Deusche Bundersbahn in Germany in the Koblenz area that operated buses outfitted with railway vehicle flanged steel wheels, "bogies", from the 1950' to the 1970's. An article in "The Transit Coalition" in 2008 asks if it is practical to create a "Bus Rapid Transit" system using dual mode vehicles and cites the Hokkaido Railway Company that since April 2007 continues testing a dual-mode road and rail bus like vehicles for operation on roadways with rubber tires and retractable railway wheels for railway operation. And a similar system, "Blade Runner Dual-mode System" noted in a June 2004 article by Carl Henderson, in "Bus and Coach Buyer" details the work done by his design firm Silvertip Design for the Dept. of Trade and Industry of the British Government and partners. The birth of roadway and railway dual purpose bus began.

The technologies to produce dual-mode vehicles with railway wheels roadway wheels implemented on vehicles are well known. U.S. Pat. No. 2,150,348 reveals a dual-mode vehicle with roadway wheels and railway wheels for operation on roads or railway tracks and U.S. Pat. No. 2,541,514 reveals an improved road and wheel caster system for road and rail dual-mode vehicles. U.S. Pat. No. 4,048,925 described a vehicle for road and rail travel and U.S. Pat. No. 4,497,257 describes a retractable wheel system for road and rail use and U.S. Pat. No. 4,583,465 describes the railway type of wheels for use on a road vehicle. U.S. Pat. No. 5,103,740 describes an air suspension system for controlling the road and rail wheels while U.S. Pat. No. 5,220,870 describes an air bag lift system to retract the railway wheels on a dual-mode rail and road vehicle. U.S. Pat. No. 5,375,533 describes a tractor and trailer truck application of such dual-mode vehicles and USPTO patent describes a system wherein the roadway wheels of a dual-mode vehicle are retracted to allow the railway, bogie wheels to engage with the railway tracks as opposed to the lowering of the railway wheels to engage the tracks and U.S. Pat. No. 8,061,277 discloses a design to improve the weight distribution loading on the wheels. U.S. Pat. No. 6,123,629 teaches railway trucks switchable at railway station platforms to roadway vehicles and U.S. Pat. No. 6,324,994 describes the mechanical systems for construction of a hybrid transit corridor and vehicles for transportation of people and goods.

The technologies to produce these dual-mode vehicles with railway wheels and roadway wheels implemented on vehicles for transportation of people are well known. U.S. Pat. No. 4,791,871 describes a dual-mode transportation system utilizing a suspended mono-rail system carrying a bus having roadway wheels for use when detached from the mono-rail and U.S. Pat. No. 5,813,349 describes a dual-mode transport system in which vehicles are electronically guided on specialized roadways and U.S. Pat. No. 6,169,954 B1 describes a dual-mode system of controlled vehicles while running on a controlled runway and manually operated on regular roads and by the same inventor, U.S. Pat. No. 6,276,542 B1 updates the computerized control of these vehicles while operating on the controlled runway including communications with a central computer system that controls the vehicles on the controlled runway.

The technologies to produce railway retractable wheels implemented on roadway buses are well known. The existing infrastructure of railway lines and roadways in modern cities are well established. The computerized systems to control and schedule the operations of railway vehicles and roadway vehicles and the safety controls and signals for their intersecting crossings are well known. A Nov. 30, 2012 article in the Information Feature section of the Toronto Ontario paper the Globe and Mail stated that the Canadian company "Thales Canada invented today's modern, automated train control technology, Communications-Based Train Control, over 25 years ago and that its products can be found in more than 30 cities around the world. This "brains for trains" technology increases efficiency by 30 to 40 percent.

However, all of the above developments have not had success or acceptance as a viable transportation system in the urban—suburban communities of today's modern major cities. This failure is because these developments have been unable to integrate the supporting road and railway infrastructures into a complete transportation network. A Wikipedia article, Transportation in Toronto noted that the need for an urban transportation system was recognized in the late 1800's with the 1892 construction of the "Belt Line Railway" but failed in 1894.

The disclosures in this patent solve these failures and reveal the components and methods for the creation of a passenger and a goods transportation network system, comprising dual-mode vehicles operating on existing railway lines, and existing roadways, and existing roadway-railway crossings, integrating administration of marshaling operations utilizing modern fuzzy logic computer means scheduling, vehicle and train tracking and movement controlling, and communications systems, thereby forming an operational transportation network system incorporating all these components. The system is an integrated transportation network system for the movement of people and of goods within, across and about an urban city environment. A new transportation network begins.

BRIEF DESCRIPTION OF THE DRAWINGS

Embodiments of the invention will now be described by way of example only with reference to the accompanying drawings in which:

FIG. 1 is schematic representation of railways and roadways in the City of Toronto, Ontario, Canada.

FIG. 2 is a schematic representation of a Rail Bus Transportation Network involving a dual-mode roadway bus fitted with retractable railway wheels, approaching a railway crossing at which the bus intends to enter the railways' tracks on which an approaching train is depicted in a specific area in the setting of the City of Toronto, Ontario, Canada.

FIG. 3 is a schematic representation of a Rail Bus Transportation Network indicating the inter-communications and control systems between dual mode Bus, Pickup and Drop-Off locations, Train, Rail Bus Central Control and Marshaling facilities, which communications and control systems are fundamental to the implementation and operations of a Rail Bus Transportation Loop Network.

FIG. 4 is a logic block diagram of the computer fuzzy logic algorithmic facilities' decision-tree structure for the monitoring, scheduling and operation of the Rail Bus Transportation Loop Network.

FIG. 5 is a logic block diagram of the computer fuzzy logic Engine system facilites' decision-tree structure for administration of user and service requests, and for administration output to the fuzzy logic algorithmic facilities for operational administration of those requests for the Rail Bus Transportation Loop Network.

DETAILED DESCRIPTION OF THE INVENTION

The Rail Bus Transportation Network Loop is a system uniquely combining and integrating existing dual-mode roadway-railway vehicles and railway-vehicles, roadways and railways components with central facilities providing the state of the art marshaling and communications systems with the newly disclosed herein controlling fuzzy logic computer logic engine means facilities administering the fuzzy logic algorithmic means, to create a safe and efficient system for the transportation of passengers and of goods.

FIG. 1 illustrates the major railways and roadways within the boundaries (1) of Toronto, Ontario, shown as an example of a large North American city transportation setting. Main-Line railways (2) and branch-line railways (3), illustrated as either dashed, or dash-dot-dash, lines, run through and crisscross the city while major freeways (4) such as the 400 series and arterial roads (8) and streets such as Lawrence Ave crisscross and surround the city.

This complex system of railways and lack of effective transportation gave rise to the creation of the Belt Line railway (5) in 1892 as a closed loop transportation system for the inner core of the city. The Belt Line did not provide the pick-up and drop-off of passengers and goods throughout the city but simply surrounded the city. It was not commercially viable and was in service for only two years 1892-94 before if failed. However it did highlight the need for some kind of transportation system encircling the city.

The Rail Bus Transportation Network Loop (7) revealed herein, solves the problems of the Belt Line by not only utilizing the railways tracks encircling the much larger present-day city, the Rail Bus Network also provides the crisscrossing and flexible urban pick-up and drop-off facilitated by the vast system of roadways and the branch-line railway tracks. In the example of Toronto, the railways and roadways are interconnected at Union Station (6), a transportation hub. Currently, Union Station is accessible by bus, railway trains, light rail Go-Trains, and the city's TTC subway.

FIG. 2 is a schematic representation that illustrates the operation of one of any number of roadway vehicles/buses (12) equipped with retractable railway wheels. As the bus in this example travels along an arterial road, Lawrence Ave, it is approaching one of any number of roadway-railway Main-Line or Branch-Line crossings (10), in this example a Main-Line crossing which permit sufficient facility to permit the bus entry to or egress from the railway tracks, in this example being such a crossing on a smaller side roadway running north off Lawrence Ave, at which crossing the bus intends to enter the train tracks. Using existing technology of retractable railway wheels and using known driving techniques the bus will be maneuvered to align with the tracks and engage the railway wheels so the bus can enter the railway tracks. Thereby, the bus will be utilizing the known efficient operations of steel wheeled railway vehicles and accessing direct unobstructed movement on dedicated tracks.

In FIG. 2, a train (11) is indicated as approaching the same crossing (10) while under the existing control technology monitoring and scheduling of the railway trains from the railway marshalling facilities (9). Clearly the need to integrate the operations of the railway trains and the roadway Rail Bus is the critical element of the Rail Bus Loop Transportation Network. Unique in the Rail Bus Loop system revealed here is the integration of these railway and roadway transportation facilities which is made possible through controlling fuzzy logic computer logic engine means facilities to be revealed herein.

FIG. 3 is a schematic representation that illustrates the communications and control systems facilities operating between the bus (12), the entry and egress locations (20) for pick-up and drop-off of goods and passengers location crossing (10), the train (11), the Rail Bus central control at Union Station (6), and the railway train marshaling control (9) comprising the Rail Bus Loop Transportation system. This integrated communications means for bus and train operations makes it possible for administration of the fuzzy logic computer logic engine means and the fuzzy logic algorithmic system means to integrate and control the bus and train operations.

In the above example of the implementation of the Rail Bus Loop Transportations system, it is envisioned that fuzzy logic algorithmic computer logic engine facilities system means for monitoring (13) data on the direction, speed, operation and routing of the bus movement uses an integrated communications means administered from facilities located at the central control at Union Station (6) the bus hub. Further, it is envisioned that fuzzy logic algorithmic computer logic engine facilities system means for monitoring (15) data on the direction, speed, operation and scheduling of the train movement uses an integrated communications means administered from facilities located at the railway marshaling facilities (9) the rail hub. Also, it is envisioned that the bus hub and rail hub communicate (14) to share these data.

In a unique and preferred embodiment of this invention, the fuzzy logic computer logic engine facilities located at the bus hub are administered to identify and administer algorithmic logic means by which the logic means derives movement decisions incorporating all communications information with and control of the bus, and which decisions and control the bus hub shares with the rail hub. Additionally fuzzy logic computer logic engine facilities located at the rail hub are administered to identify and administer algorithmic logic means by which the logic means derives movement decisions incorporating all communications information with and scheduling of the train, which decisions and scheduling of the train the rail hub shares with the bus hub. In this way all operations of the bus remain the responsibility of the bus hub and all operations of the train remain the responsibility of the rail hub while the communications between the hubs keeps both up to date on the other's operations.

FIG. 3 also illustrates the control systems facilities and inter-communications (16) operating between the bus (12) and the train (11) such that these communications with the train can also be communicated (13) from the bus (12) to the Union Station bus hub (6). It is further envisaged that the train could also communicate (19) directly to the bus hub (6) in an additional embodiment of this invention in which the bus hub (6) could take control of the scheduling of the train. Also in this embodiment, the rail hub (9) can also communicate (17) directly to the bus by which the rail hub (9) could take control of the movement of the bus (12). This shared control of the bus (12) by the railway marshaling (9) located fuzzy logic computer logic engine means, and the shared control of the train (11) by the bus hub (6) located fuzzy logic computer logic engine means provides a double redundancy control of the Rail Bus Loop Transportation system.

It is envisioned that the vehicles/buses operating on the railway tracks will have means for activating any crossing warning, signaling, roadway traffic controlling means such as but not limited to guard gates and arms, flashing lights, audible alarms utilized by and for train traffic moving across these crossings at such roadway-railway crossings. It is further envisioned that the said vehicles/buses can egress from or enter to said railway tracks at any said crossing having the means to permit said egress or entry.

In a unique and preferred embodiment of this invention, and as illustrated in the logic flow diagram of FIG. 4 of the fuzzy logic algorithmic means administered by the computer logic engine means, there is provided the fuzzy logic computer logic engine means located at both the bus hub (6) and the train hub (9), the administering (405) of an over-ride means whereby human operators (415) monitoring the operations of the fuzzy logic computer logic engine means decisions controlling the Rail Bus Loop Transportation system, those operators can (416) impose changes (417) to and cancellation of any decisions resulting from the administration of the fuzzy logic algorithms controlling the Rail Bus Loop Transportation system. This provides the human operators to administer (405) ultimate command, control and decisions (404) regarding the functioning and safe operation of the Rail Bus Loop Transportation system.

The fuzzy logic algorithmic means revealed in this patent administers the monitoring and control of these safe operations employing a fundamental component of the Rail Bus Loop Transportation system, that being the communications means as illustrated in FIG. 3, and begins with utilizing these communications means to make system requests (401) such as but not limited to observations as shown in the flow diagram of FIG. 4. Other such system requests are such as but not limited to, passenger services, goods carriage, communications, operations, and system marshaling service requests. All these requests and any data input such as but not limited to: running schedules of train and bus vehicles, movement of these vehicles, requests from pick-up and drop-off communications means for service or bus information or ticketing, and general system wide communications data from observations are input (402) and recorded in databases (403). The train data and schedules are stored in databases (409) and bus data and schedules are stored in databases (408).

All requests are administered (404) and any required output for but not limited to passengers, goods carriage, observations, communications, operations and others are output (418) to their specific destinations, such as but not limited to display systems means implemented for such as but not limited to users, operators, of the Rail Bus Loop Transportations system such as but not limited to located at pickup and drop-off locations (10) or on the bus (12) or at the Bus hub (6) or on the train (11) or the Train hub (9), wherein said output is administered by the fuzzy logic algorithmic means (418) via the communications facility means (13, 14, 15, 16, 17, 18, 19, 20).

The logic algorithmic means for control of Rail Bus safe operations and efficient egress from or entry to the railway tracks determination (404) is administered and requests for Rail Bus egress from or entry to the railway loop are further administered (405) where determinations of interpretations of the request are administered such as those coming from but not limited to, Train hub (9), Bus hub (6), drop-off and pick-up locations (10) or other remote locations such as for but not limited to passengers or shippers requests.

The fuzzy logic algorithmic means administered to input requests (405) with communications to a human operator (415) permits the operator to view all these data from which the operator can assess the system operation and determine (416) if an over-ride of any request to or control of the Rail Bus system is needed. If administer of over-ride and/or change of the system operation or control is determined (416) the operator can implement what over-ride must be administered and input (417) to the system implementation of that over-ride via communications to the input determination request (405) and subsequently to the Egress or Entry (404) determination. The algorithmic means administered at the Egress or Entry (404) determination can also determine (406) if access and retrieval (407) of any of the data in the databases (408 and/or 409) as recorded and stored (403) is required and if so required said data are passed (407) back to the request determination of Egress or Entry (404) for further administration of the fuzzy logic algorithmic means which determines if any further data are required (406). The administration of the fuzzy logic means (410) further determines if any conflict exists between bus and train operations in the Rail Bus Loop Transportation system. If the logic means determines (410) that a conflict exists the further administration of the fuzzy logic algorithm means determines (411) a safe Egress or Entry command control which the logic means (411) communicates back to the observations determination fuzzy logic means (401). Once all conflicts have been resolved by the fuzzy logic algorithmic system means such that the fuzzy logic determines (410) that no conflict exists the fuzzy logic means communicates (412) to the Rail Bus system that egress or entry can proceed as requested and the fuzzy logic means communicates (412) to the Rail Bus system (413) to confirm completion of egress or entry and then the fuzzy logic means communicates (412) to the Rail Bus system to update (414) Rail Bus system details of the egress or entry by communicating these details back to the observations determination fuzzy logic means (401).

The fuzzy logic engine system means illustrated in the diagram of FIG. 5 administers the Rail Bus system user's and service requests input (501) to the system. Requests are submitted (501) and the system means administered to determine if they are for passenger services (502) and if so are further determined by administration of fuzzy logic (503) to be but not limited to schedules, ticketing, payment, and output (504) to the fuzzy logic algorithmic systems request means (401). If the request (502) is not for passenger services then the fuzzy logic means are administered (505) to determine if the requests are for observations services and if so, these services are further determined (506) as to specific requirements and input (504) to the system. If the request (505) is not for observations services then fuzzy logic means are administered (507) to determine if the requests is for Goods services and if so, these services are further determined (508) as to specific requirements and input (504) to the system. If the request (505) is not for Goods services then fuzzy logic means are administered (509) to determine if the requests is for Operations services and if so, these services are further determined (510) as to specific requirements and input (504) to the system. If the request (509) is not for Observations services then fuzzy logic means are administered (511) to determine if the requests is for Communications services and if so, these services are further determined (512) as to specific requirements and input (504) to the system. If the request (511) is not for Communications services then fuzzy logic means are administered (513) to determine if the requests are for Other services and these services requirements are input (504) to the system.

In a preferred embodiment of the Rail Bus Loop Transportation system, the fuzzy logic computer logic engine means and fuzzy logic algorithm means are also located at the pick-up and drop-off locations and through the communications means of the Rail Bus system, can have the functions such as but not limited to displaying the bus locations, schedules, arrival and departure times at said locations as well as functions of payment and issue of tickets for passengers or goods to be carried on the Rail Bus system. Further the preferred embodiment the means located at the pick-up and drop-off locations can have the functions such as but not limited to voice and/or video observations and communications with the Rail Bus hub permitting observations at the said pick-up and drip-off locations of said passengers or goods for identification and security purposes, as well as observing their entry or egress from the Rail Bus and further to observe the Rail Bus entry to or regress from the railway tracks at said locations.

In a further preferred embodiment of the Rail Bus Loop Transportation system, all communications with the Rail Buses, and with the pick-up and drop-off locations are controlled and routed via and through the Rail Bus hub. Additionally, all communications with the trains, and with any train station locations are controlled and routed through the Railway hub. This preferred embodiment further provides that full communication of all observations, controls, scheduling, train and bus movements are fully communicated between the Railway hub and the Bus hub such that they share all data and information on the operations of the Rail Bus Loop Transportation system but they each retain full control, Railway hub over trains, Rail Bus hub over buses and management of their independent facilities and vehicles.

In an additional preferred embodiment of the Rail Bus Loop Transportation system, the Rail Buses can have communications with the trains and with the railway marshalling facilities in addition to the marshaling facilities also receiving all communications with the Rail Buses, the pick-up and drop-off locations such as to permit the control and operations of the Buses to be administered by the marshaling facilities Railway hub. This will permit the Railway hub to take over full control of the Rail Bus Loop Transportation system if in an emergency such as but not limited to failure of the Bus hub facilities.

Alternatively, if in an emergency, both the Bus hub and the Rail hub facilities were to fail, this preferred embodiment allowing communications between buses and trains could permit safe control and if needed shut down of trains and buses operations in the Rail Bus Loop Transportation system according to any established protocols for buses and trains operations as may be established for such emergency conditions.

In a further alternative emergency, such as but not limited to the failure of the Railway hub facilities, this preferred embodiment allowing said communications could permit the Bus hub to independently command all buses currently running on the railway tracks of the Rail Bus Loop Transportation system to egress the tracks at the next available accessible crossing of the tracks with any roadway. Due to the buses capability to operate on railways or on roadways said egress would not necessarily require being at a pick-up and drop-off location. In such an emergency the Bus hub administration of the Bus hub communications means could inform all trains operating on the tracks of the Rail Bus Loop Transportation system of the failure of the Rail hub and the immediate removal of all buses from the said tracks. In such an emergency, the buses egress the Railway facilities and the Railway emergency protocols to control the Railway facilities as established, implement their emergency procedures.

Further is will be clear to anyone versed in the technology of dual-mode vehicles means equipped to operate on roadways and railways, that a system based on such vehicles is very flexible to permit access to or egress from train tracks at any level crossing of the tracks with a roadway wherein such facility means permits. Further, it will be clear that such flexibility will allow use of such equipped vehicles such access or egress anywhere said crossing means exist and for any type of vehicle such as but not limited to bus, truck, car, moving equipment, repair equipment and need not be limited to a Rail Bus Loop Transportation system but can apply to any railway and roadway transportation system employing roadway-railway crossing means. The essential components to successful and authorized operations of any such dual-mode vehicles means on railway track means are the integration of these vehicles means, roadway means and railway means and the incorporation of the communications and fuzzy logic algorithmic means administered by the computer logic engine means as revealed in this patent.

Further is will be clear to anyone versed in the technology of vehicles equipped to operate on roadways and railways and the technologies for scheduling, control and operations of bus and train systems that are uniquely integrated into the Rail Bus Transportation Loop system solution of the transportation problems of major urban/city environments is made possible by the incorporation of the unique communications and fuzzy logic algorithmic means administered by the computer logic engine means revealed in this patent.

What I claim is:

1. An optimized and safe computerized railway and roadway transportation networked system is claimed incorporating methods of modern computer vehicle monitoring and marshalling facilities administering computer fuzzy logic assessment active engines for scheduling, monitoring, and controlling the movement of vehicles operating in and of the network, for said vehicles operating within the geographic area in which the networked system is functioning and said system providing the communications with the vehicles and providing the computerized vehicle monitoring and marshalling and controlling facilities of the network; said networked system comprising vehicles equipped with dual-mode wheel mechanisms for movement on railways and movement on roadways that are existing within the said geographic area of operation of said network and including any switching and signalling facilities necessary for interconnecting railway lines of said railways for said vehicle scheduled movement along and between said railway lines said roadways and said railways and roadways having road-rail level crossing facilities within said geographic area, permitting entry and egress to and from said railways from said roadways by said vehicles having said dual-mode mechanisms, said vehicles having railway wheel facilities and having roadway wheel facilities one of which wheel facilities are retractable, and said network incorporating computerized communications facilities on said dual-mode vehicles and on all other vehicles using said railways within said area, and said network incorporating centralized computerized vehicles-location facilities with computerized communications facilities to all said vehicles, and said network incorporating centralized computerized control facilities for said monitoring and marshalling and controlling of all said vehicles operating on said network.

2. A system according to claim 1 said centralized computerized facilities include software algorithms and fuzzy logic assessment active engines with fuzzy logic algorithms administered for the movement control of and integrated operation of all said vehicles operating on said railways and roadways.

3. A system according to claim 1 including a communications system with fuzzy logic algorithm computers administered software engines administered to permit inter-communications between said dual-mode vehicles and said railway-vehicles operating on said railways and said roadways.

4. A system according to claim 1 including geo-location facilities, such as but not limited to GPS technologies, implemented on all said vehicles, said geo-location facilities communicating on said communications facilities the said geo-location facilities produced data streams of the location data of said vehicles on said railways and said roadways of said network, to said marshaling facility.

5. A communications system according to claim 4 including fuzzy logic active computer engine marshaling and mapping software at said marshaling facility, administered to said location data permitting the monitoring of the movements of said dual-mode vehicles and said railway-vehicles for determination of their scheduling of said dual-mode vehicles and said railway-vehicles to determine their safe operation on said roadways and said railways of said network.

6. A system according to claim 1 wherein said vehicles with said dual-mode wheel mechanisms have facilities including one or more sets of steerable wheels to permit the said vehicles entrance to the said railways from said roadways and egress from said the said railways to said roadways at said road-rail crossing facilities of said network.

7. A system according to claim 1 wherein said vehicles with said dual-mode wheel mechanisms have a wheelbase length from front wheels to back wheels of both the said roadway wheels and the said railway wheels to permit the said vehicles entrance to and egress from the said railway lines, from said roadways at the said roadway and railway crossing facilities of said network.

8. A system according to claim 1 wherein said vehicles with dual-mode wheel mechanisms, have incorporated into their said mechanisms, steerable wheels capability of steering both the front and the rear wheels to permit said vehicles egress from and entrance to said railways at said crossings facilities.

9. A system according to claim 6 wherein said vehicles with said steerable wheels have steering mechanisms permitting said vehicles egress from and entry to said railway lines at said crossings which crossings do not require additional crossing facilities other than those existing on roadway and railway crossings facilities of said network.

10. A method of providing an optimized and safe computerized transportation networked system operating within a geographic area established for operation of the said networked system and said system incorporating methods of modern computer vehicle monitoring and marshalling facilities administering computer fuzzy logic assessment active engines for scheduling, monitoring, and controlling the movement of vehicles of the said networked system operating within the said networked system and which said vehicles are utilizing the roadways and railways existing within the geographic area in which the said networked system is functioning including any switching and signalling facilities necessary for interconnecting railway lines of said railways for movement along said railway lines by said vehicles said monitored, marshalled and controlled for movement along and between said railway lines of said network and level crossing facilities of said railway lines with said roadways, and said network including dual-mode vehicles capable of moving on roadways and on railways and capable of entrance to or egress from said railways railway lines at said level crossings or any other crossings having said facilities for such entry or egress, said vehicles incorporating railway wheel facilities and roadway wheel facilities one of which wheel facilities are retractable and said vehicles incorporating steerable roadway wheels, and said network including all other vehicles operating on said railways of said network, and each of which said vehicles incorporating mobile computerized communications facilities and each of which said vehicles incorporating mobile geo-location facilities, for which said geo-location facilities provide data streams of said vehicle geo-location information, and said network including centralized computerized software algorithms and fuzzy logic assessment active engines with fuzzy logic algorithms for the marshaling and scheduling and communications and database facilities for storage and retrieval of said location information and storage of movement parameters used by said algorithms, and said network including locations with computerized communications facilities at which locations passengers and/or goods can be drop off and/or pick up, and said centralized facilities including a first computer implemented geo-location engine to receive and monitor said movement geo-location data streams of said vehicles, and said network including a second computer implemented assessment active engine with fuzzy logic algorithms for administration to said data for the monitoring, marshaling, scheduling and determination of optimum movement and control of said movements of said vehicles, and said network including a third computer implemented assessment software algorithms and fuzzy logic assessment active engines with fuzzy logic algorithms for handling the communications between said vehicles, and communications between the said central facilities and the said vehicles, and communications between said central facilities and with said locations, and said network including operating personnel, and said network including facilities by which said operators can input and/or update data to said databases and facilities by which said operators can override the computers of said network and said operators can take over control of the movements of all vehicles on said network.

11. The said method according to claim 10, comprising the steps of utilizing said first computer assessment engine using said network centralized communications facilities communicating with said vehicles' mobile communication facilities to receive, assess, and store in database facilities said geo-positioning data streams from all said vehicles' and from which to determine said vehicles movements, and steps of utilizing said second computer implemented assessment engine to perform monitoring of movements of all said vehicles, and the said second computer to administer marshaling software algorithms and schedule algorithms to said data streams and including said second computer utilization of data established in said databases with which said second computer can determine the optimum operations of said vehicles, and which said second computer can input to said databases, information and data updates supplied by said operators of said network for said determinations of the optimum movements and operations of said vehicles, and whereby said second computer determines and controls the movements of all said vehicles and includes determination of scheduling of the movements of all said vehicles, and determines and controls of any switching facilities necessary for interconnecting the said railway lines for said vehicle scheduled movement along and between said railway lines and the said third computer includes utilizing implementing the said third computer active engines for communications of the said determinations of the controlling of the operations of the said network centralized communications facilities and said communications with said vehicle mobile communications facilities by which said third computer administers software algorithms with which said third computer communicates said controls of the said movements of said vehicles and communicates said scheduling and said commands of said movements of said vehicles to the said vehicles, and said network further having communications facilities at locations in said network wherein passengers or goods carried by said vehicles can be picked up or dropped off, with which said centralized facilities communicates to said locations said movements and said scheduling and said commands of movements of said vehicles.

12. A communication method according to claim 10 wherein said marshaling facility includes an active logic engine incorporating an active logic decision engine administered to said geo-location data streams and to administer said marshaling algorithms for determination of safe and optimum scheduling and operation of said dual-mode vehicles and said railway-vehicles on said transportation network, and said communications method including facilities by which said operators of said network can override said algorithms determinations such that said operators can take over monitoring, controls, operations, and communications, with all said vehicles operating on the said transportation network.

13. A method according to claim 10 including databases containing records of said marshaling and scheduling data and said geo-location data streams, to determine active monitoring of all operating said dual-mode vehicles and said railway-vehicles on said transportation network.

14. A method according to claim 10 wherein records of said marshaling and scheduling databases include categories of conditions to permit outputs to be administered for determination of updated marshaling and scheduling suitable to be adjustable for selected conditions and a determination of new marshaling and scheduling decisions reflecting the latest conditions of dual-mode vehicles and railway-vehicles and passenger loads and goods loads requirements for operation on said network.

15. A method according to claim 10 wherein said communications facilities includes a geo-location facility in each of said dual-mode vehicles and each of said railway-vehicles, to present their locations and velocities and directions of movements on said network for monitoring by said marshaling facilities.

16. A method according to claim 10 wherein said second computer active logic engine is administered to determine operating conditions of said all vehicles and control of said operating conditions with which said computer determines and administers control of required warning systems at said roadway and railway crossing facilities on said network wherein said warning systems are remotely controlled and wherein said warning systems are manually or mechanically controlled said administration of computer engine can assure from said communications with said dual-mode vehicles and railway-vehicles that said warning systems have been deployed.

17. A method according to claim 10 wherein said second computer active logic engine of said marshaling facilities is administered to determine likely arrival times of said vehicles at scheduled roadway or railway locations in said transportation network where passengers or where goods can be loaded or off-loaded from said vehicles and wherein said third computer communicates said arrival times with communications facilities at said locations.

18. A method according to claim 17 wherein a display facility is provided at said locations to display said arrival times on said display facility.

19. A method according to claim 17 wherein communications facilities are provided at pickup and drop-off locations in said transportation network wherein said communications with said logic engine provide display facilities and input-output facilities to provide a method whereby said passengers and providers and receivers of said goods have communications means between said facilities and said logic engine.

20. A method according to claim 19 wherein said communications facilities with said logic engine provide additional information to said engine to update said scheduling requirements for any said railway locations in said network and whereby said logic engine can output and display said update scheduling on the said display and said input-output facilities at said locations.

21. A method according to claim 10 wherein said roadway or railway locations in said network are provided with facilities for the purchase of tickets for passengers and for goods, for carriage on said vehicles operating within the said network, said facilities communicating said purchases to said centralized marshaling facilities utilizing said communications facilities at said locations.

22. A method according to claim 10 wherein the said second computer logic engine algorithms controlling movements of said vehicles on said network are administered to determine operation and control of any switching facilities necessary for interconnecting the said railway lines for said vehicle scheduled movement along and between said railway lines and wherein said third computer logic engine administers communications of said switching control to said switching facilities utilizing existing communications facilities of said switching facilities.

23. A method according to claim 10 wherein said roadways and said railways can be integrated to form a computerized integrated transportation closed-loop transportation network for said transport of passengers and goods by said dual-mode vehicles having said communication facilities and said centralized facilities having said fuzzy logic computer engines utilized and administered to provide communications to said vehicles said marshaling communications and said controlling communications wherein said administration of said computerized integration can determine all operations of vehicles operating on said transportation network by which to form a looped transportation network of said dual-mode vehicles operating on said railways and operating on said level crossing interconnected roadways for the pickup and drop-off of passengers and of goods, thereby providing an integrated looped transportation network system surrounding and crossing the urban and metropolitan areas of a city region.

24. A method according to claim 23 wherein said dual-mode vehicles having said mobile communications facilities for which administration of said facilities provides to said passengers and provides to said goods shippers and provides to receivers of said goods, a communication facility with said marshaling facilities by which to administer arrangements for transportation of said passengers and said goods on said looped transportation network to permit said marshaling of said pickup and drop-off locations facilities on the said looped transportation network for which said locations with said communications facilities and administration of said computer fuzzy logic engines and software algorithms can permit the ticketing, payment, and shipping arrangements for the said pickup and drop-off of said passengers and of said goods at said locations and said dual-mode vehicles are provided with said communications facilities and said computer fuzzy logic engines and software algorithms, for which the administration of said algorithms can provide for the ticketing, payment, and shipping arrangements facilitating the said pickup and drop-off of said passengers and of said goods at said locations.

25. A method according to claim 10 wherein said centralized monitoring facilities first computer receives said communications geo-location data from the vehicles operating on the network for which administration of the second computer fuzzy logic monitoring algorithms can determine from said data if any of the said vehicles are stationary while located on the railways of the said network and said algorithms can determine if said stationary vehicles have been stationary for a preset selectable period of time as pre-stored in said databases and can determine that said vehicles and that administration of said fuzzy logic algorithms determines said period of time has been exceeded and can determine that said stationary vehicles could present a potential collision safety hazard on the said network.

26. A method according to claim 25 said determination of a vehicle or vehicles as being stationary on said railways of said network wherein said central facilities second computer logic engines are administered to consult said databases for remedial notification protocols to follow for stationary vehicles and using said third computer communications facilities communicates to all vehicles operating on said network and to all operators of said network, the location of said stationary vehicle or vehicles and the said protocols.

27. A method according to claim 25 with which said time period information determined by said marshaling facilities said marshaling facility administering of said controlling fuzzy logic computer logic engine determines and administers marshaling decisions accommodating for said stationary vehicle for the safe operations of the said looped transportation network system.

28. A method according to claim 10 in which the said dual-mode vehicles operating on the said railways or on said roadways, have mobile computer fuzzy logic engines for controlling and activating any existing crossing warning, signaling, and roadway traffic controlling facilities such as but not limited to guard gates and guard arms, flashing lights, audible alarms such as but not limited to those means activated by or for vehicular or pedestrian traffic moving across said roadway-railway crossings.

* * * * *